No. 831,850. PATENTED SEPT. 25, 1906.
E. D. FISHER.
ATTACHMENT FOR CORN PLANTERS.
APPLICATION FILED FEB. 28, 1906.

3 SHEETS—SHEET 1.

WITNESSES:

Emanuel D. Fisher,
INVENTOR.

By C.A.Snow&Co
ATTORNEYS

No. 831,850. PATENTED SEPT. 25, 1906.
E. D. FISHER.
ATTACHMENT FOR CORN PLANTERS.
APPLICATION FILED FEB. 28, 1906.

3 SHEETS—SHEET 2.

Emanuel D. Fisher,
INVENTOR.

WITNESSES:

By
ATTORNEYS

No. 831,850. PATENTED SEPT. 25, 1906.
E. D. FISHER.
ATTACHMENT FOR CORN PLANTERS.
APPLICATION FILED FEB. 28, 1906.
3 SHEETS—SHEET 3.
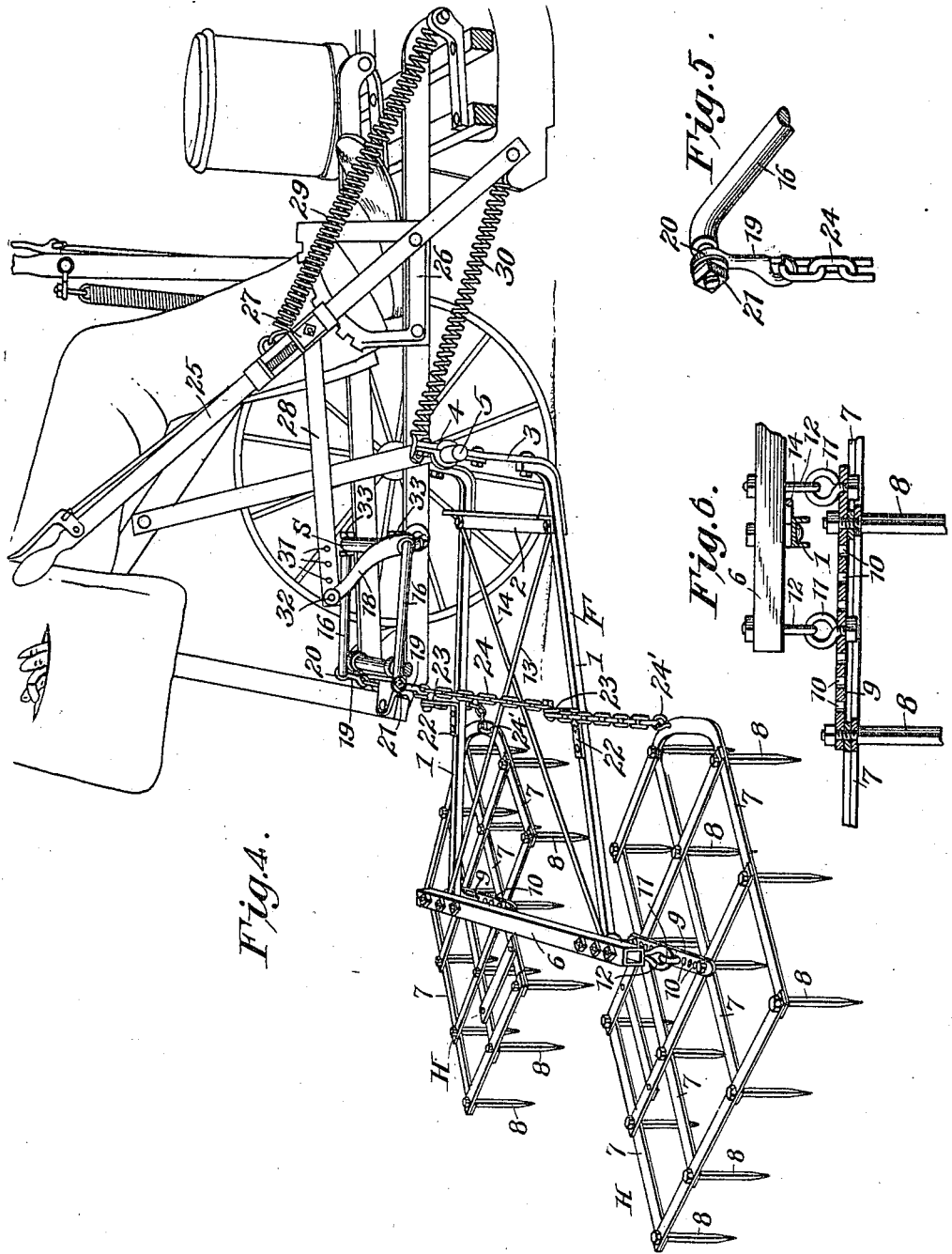
WITNESSES: Emanuel D. Fisher, INVENTOR
By
ATTORNEYS

UNITED STATES PATENT OFFICE.

EMANUEL D. FISHER, OF UNDERWOOD, IOWA.

ATTACHMENT FOR CORN-PLANTERS.

No. 831,850.   Specification of Letters Patent.   Patented Sept. 25, 1906.

Application filed February 28, 1906. Serial No. 303,484.

*To all whom it may concern:*

Be it known that I, EMANUEL D. FISHER, a citizen of the United States, residing at Underwood, in the county of Pottawattamie and State of Iowa, have invented a new and useful Attachment for Corn-Planters, of which the following is a specification.

This invention relates to attachments for corn-planters; and the object of the invention is to provide a device which may be conveniently attached to various styles and makes of corn-planters for the purpose of pulverizing and leveling the soil in the track of the planter.

The invention consists in the improved construction and novel arrangement and combination of parts, which will be hereinafter fully described, and particularly pointed out in the claims.

Figure 1:
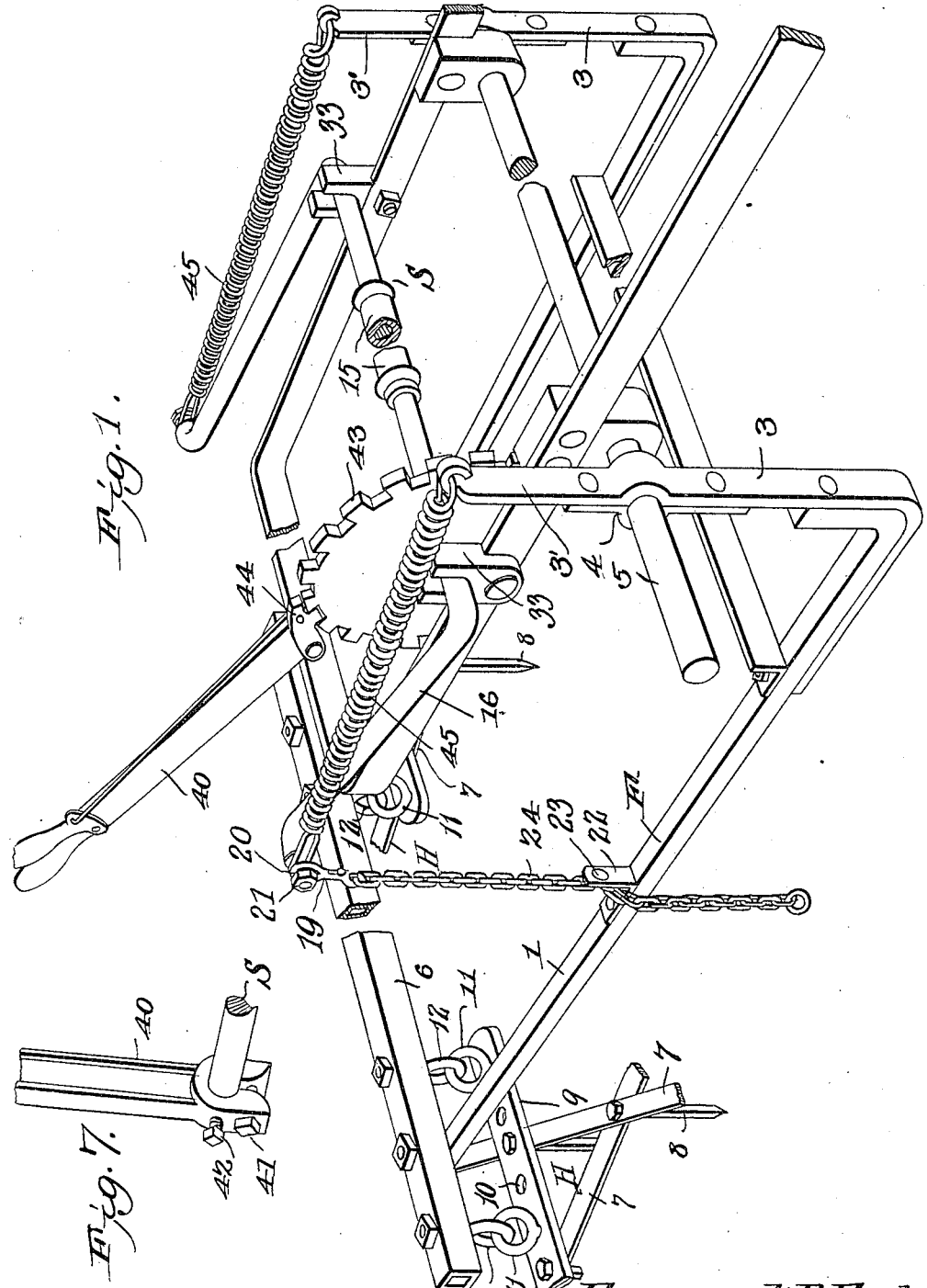
Figure 2:
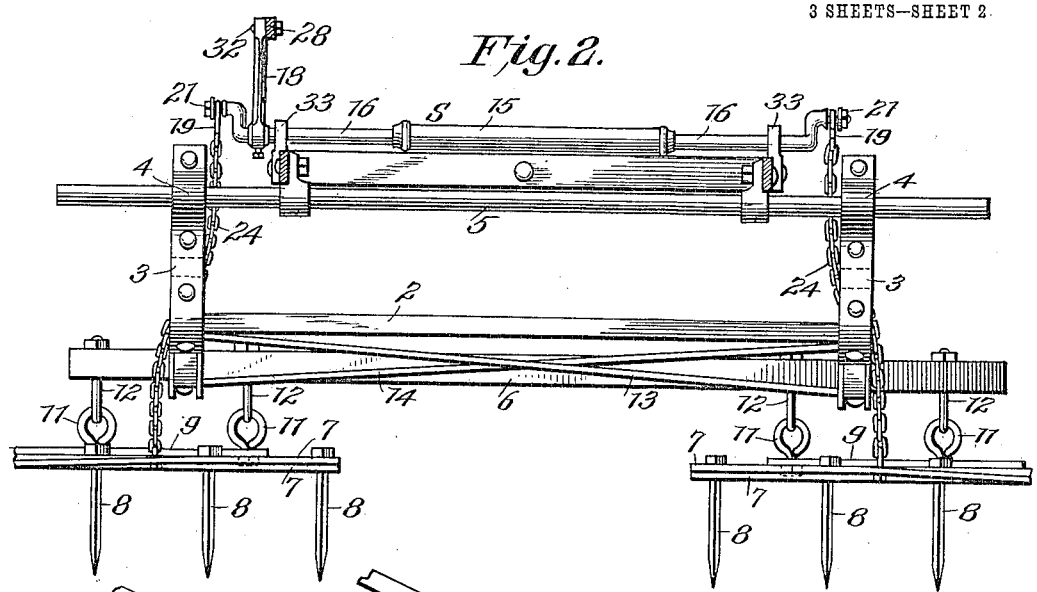
Figure 3:
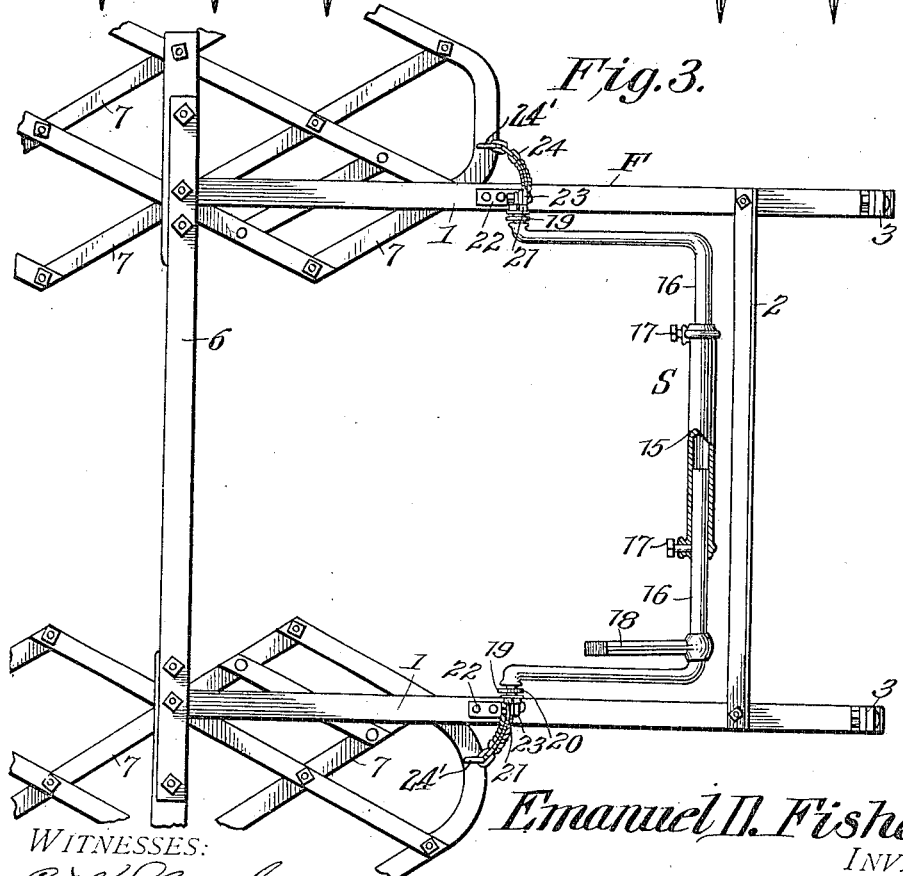

In the drawings, Figure 1 is a perspective view of the planter attachment with parts removed and with parts broken away. Fig. 2 is a front elevation of a modified form of the planter attachment. Fig. 3 is a top plan view of the form of attachment as shown in Fig. 2. Fig. 4 is a perspective view of the last said form of the planter attachment, showing the same in operative position with the planter. Fig. 5 is a perspective detail view of a portion of one of the cranks of the lock-shaft. Fig. 6 is a sectional detail view taken through a portion of one of the harrow-sections or trailers and related parts. Fig. 7 is a detail view of the adjusting-lever.

Corresponding parts in the several figures are indicated throughout by similar characters of reference.

The improved attachment includes a frame F, which may be constructed of wood, metal, or any other suitable material, but which is preferably made up of tubular, angular, and channel-steel bars of suitable dimensions, said frame being preferably of rectangular or approximately rectangular shape. The side members 1 1 of said frame are extended forwardly of the front cross-piece 2 and are provided with upwardly-extending brackets 3 3, provided near their upper extremities with boxes or bearings 4, adapted for engagement with the axle 5 of an ordinary corn-planter, with which the frame of the attachment may in this manner be detachably connected. The rear cross-bar 6 of the frame F is extended laterally beyond the side members 1 1 for connection with the trailing harrows or pulverizers to be presently described.

The trailing harrows or pulverizers H H are composed of suitably-constructed approximately diamond-shaped frames composed of iron or steel straps 7 7, said frames being provided with downward-extending teeth 8. Each of the frames of the harrows or trailers is provided with a cross-bar 9, having a plurality of apertures 10 for the reception of an eyebolt 11, which is linked together with another eyebolt 12, which latter extends through and is connected with the rear cross-bar 6 of the main frame F of the attachment. The eyebolts 11 and 12 coöperate to form hinges, whereby the harrows or trailers are flexibly connected with the frame F.

The frame F is strengthened and reinforced by diagonals 13 14, that connect the diagonally opposite corners of said frame. (See Figs. 2 and 4.)

For the purpose of raising and lowering the free end of the frame F, together with the trailers carried thereby, a rock-shaft S is provided, said rock-shaft being composed of a tubular member 15 and a pair of crank members 16 16, which telescopically engage the intermediate tubular member and are adjustably connected with the latter, as by means of set-screws 17. The rock-shaft S is thus capable of being adapted to be used in connection with planter-frames of different widths. In the form of the device as shown in Figs. 2, 3, and 4 one of the crank members 16 is provided with a radially-extending arm 18. Each of the crank members 16 carries a snap-hook 19, having a loop or eye 20, rotatably engaging the crank upon which it is secured by threading a nut 21 upon the latter. The side members 1 1 of the frame F are provided with angular straps or brackets 22, having terminal eyes 23, with which are connected chains 24, said chains being connected with said eyes intermediate the ends of the chains, the upper ends of which are connected adjustably with the snap-hooks 19 and through the latter with the cranks of the rock-shaft S, while the lower ends of the chains are connected with eyebolts 24' (see Fig. 4) at the front ends of the trailers H.

An adjusting and operating lever 25 is provided, which is fulcrumed upon a quadrant 26, which latter is bolted or otherwise secured in position upon the frame of the corn-planter in connection with which the improved attachment is used. The lever 25 is provided with a stop member 27, engaging the quadrant 26 for the purpose of retaining said lever and related parts at various adjustments. A link 28 connects the adjusting-lever 25 with the radially-extending arm 18 of the rock-shaft S, which latter is thereby adapted to be oscillated in its bearings. Springs 29 and 30, which are connected with the lever 25, respectively above and below the fulcrum of the latter, are suitably connected with the planter-frame, respectively in front and in rear of the fulcrum of the lever, the tension of said springs being exerted to assist in elevating the free end of the frame F and the trailers carried thereby. The link 28 has been shown as provided with a plurality of apertures 31 for the passage of the pin or bolt 32, whereby it is connected with the arm 18 of the rock-shaft S in order to enable various adjustments to be made and to enable the attachment to be conveniently connected with planter-frames of different lengths.

The rock-shaft S is operatively supported in bearings 33, which are usually provided upon planters for the purpose of supporting the reel or drum upon which check-wire is wound. Planters that are not thus equipped may be provided with special bearings for the said rock-shaft. When the improved device is used in connection with a check-row corn-planter employing check-wire, the rock-shaft S may, while the check-wire is being unreeled or wound, be supported upon the planter-frame in rear of the bearings, as will be readily understood.

In the form of the invention shown in Fig. 1 the adjusting-lever 25, the rack member 26, the link 28, and the springs 29 and 30 are dispensed with, and the radial arm 18, extending from the rock-shaft, is replaced by a lever 40, whereby the rock-shaft may be directly manipulated, said lever being secured upon the rock-shaft, as by means of a clamping-bolt 41 and a set-screw 42. A rack-segment 43 is secured upon the frame of the corn-planter by any suitable means, preferably by means of the bolt, whereby one of the brackets 33 is connected with the planter-frame. The lever 40 is provided with a stop member 44, engaging the rack-segment for the purpose of securing the parts at various adjustments.

The upturned brackets 3 3 at the front end of the frame F are provided with upward extensions 3' 3', that project a suitable distance—say about five inches—above the axle 5, upon which the brackets 3 3 are pivotally mounted. These extensions 3' 3' of the arms 3 3 are connected, by means of springs 45, with the cranks 16, extending from the rock-shaft, and which are connected with the frame F for the purpose of effecting the desired adjustment of the latter, as hereinbefore described.

It will be seen that when the adjusting-lever 40 is moved in a forward direction for the purpose of raising the trailing harrows from the ground the springs 45 will be collapsed. The tension of said springs will thus be exerted to assist in lifting the weight of the harrows. When, on the other hand, the adjusting-lever 40 is moved in a rearward direction for the purpose of lowering the harrows, the springs 45 will be expanded, and tension will thus be exerted in a rearward direction upon the upper ends of the extensions 3' of the arms 3, thus causing a direct downward pressure to be exerted on the rear end of the frame F, whereby the harrows will be forced into the ground, the pressure being, however, resilient, so that the harrows will be able to rise against said pressure sufficiently to enable them to ride over any obstructions that may be encountered.

As is well known, the seed that is deposited in the ground by corn-planters of ordinary construction is covered by the wheels, which are usually provided with wide concave rims or tires, whereby the soil is compressed upon the seeds. This process of covering leaves the ground indented with long narrow furrows or gutters, through which in the event of rain the water will be conducted, with the effect of washing out the seeds. In order to minimize this danger, it has been customary for many farmers to plant and to harrow on alternate days or to harrow a field immediately after planting, the object being to break and pulverize the soil, to level the ground, and to fill the furrows or depressions made by the planter. By the present invention trailing harrows are provided, which follow directly in rear of the covering-wheels, thus obliterating the objectionable furrows at the time of planting and if not entirely dispensing with the necessity of subsequent harrowing enable the harrowing operation to be postponed without danger of the seeds being washed out of the ground in the event of early rain.

The several forms of the improved attachment, as hereinbefore stated, are applicable to various styles and makes of corn-planters. They may be readily applied to planters of different widths, since the rock-shaft S is adjustable as to length, and the harrows and trailers H are connected adjustably with the adjusting-frame F by means of the eyebolts 11, that are connected with the straps 9, the latter having spaced perforations for the reception of said eyebolts. The attachments are also adapted to be used in connection with planters of various heights, since the supporting-chains 24 are adjustably connected with the cranks 16 of the rock-shaft S through the medium of the snap-hooks 19.

The device which constitutes the present invention and which comprises the frame F, the harrow-sections or trailers H H, the rock-shaft S, the adjusting and securing mechanism, and related parts may be manufactured as an independent device that is applicable to and adapted to be used in connection with corn-planters generally.

It is desired to state that the trailers or harrow-sections may be of any desired and preferred construction and that the teeth of the harrows may be tilted in a forward or in a rearward direction or may occupy a straight vertical position, as may be preferred. It is also to be understood that the adjusting-lever may be either at the right or left side of the driver, such changes being clearly within the scope of the invention.

When the invention is applied to and used in connection with planters that are equipped with a marker of ordinary construction, connection may be provided whereby the marker will be raised by the action of the same lever that is utilized for raising the trailers from the ground, thus simplifying the construction.

Having thus described the invention, what is claimed is—

1. An attachment for corn-planters consisting of a frame having side members provided with bearings supported upon the planter-frame and a rear cross-bar extended laterally beyond the side members, trailers hingedly and adjustably connected with the rear cross-bar, and flexible connections between the front ends of the trailers and the side members of the frame.

2. A frame having side members provided with upstanding brackets at their front ends and bearings upon said brackets supported upon the planter-frame, a rear cross-bar extended laterally beyond the side members of the frame, trailers having cross-bars provided with apertures, interengaging eye-bolts connected with said cross-bars and with the rear cross-bar of the frame, and flexible connections between the front ends of the trailers and the side members of the frame.

3. An attachment for corn-planters comprising a supporting-frame having side members provided with bearings at their front ends supported upon the planter-frame, trailers connected with the rear portion of said frame, a rock-shaft supported in bearings on the planter-frame and having cranks, flexible members connecting said cranks with the side members of the frame, and adjusting and securing means for the rock-shaft.

4. An attachment for corn-planters comprising a frame having side members provided with bearings near their front ends supported upon the planter-frame and with arms extended above said bearings, trailers attached to the frame, flexible connections between the trailers and frame, a rock-shaft supported in bearings in the planter-frame and having cranks, flexible members connecting the cranks with the side members of the frame, springs connecting the cranks with the upwardly-extending arms at the front ends of the side members, and means for manipulating the rock-shaft and for securing it at various adjustments.

5. An attachment for corn-planters comprising a frame having side members provided with upturned brackets having bearings supported upon the planter-frame and arms extending upwardly from said bearings, trailers attached to the frame, flexible connections between the trailers and frame, a rock-shaft supported in a bearing on the planter-frame and having cranks, flexible members connecting the cranks with the side members of the frame, springs connecting the cranks with the arms extending upwardly from the bearings upon the brackets at the front ends of the side members of the frame, an arm extending from the rock-shaft and constituting an adjusting-lever, and means for retaining said lever and the parts operated thereby at various adjustments.

6. The combination with a corn-planter, of a hinged trailer-carrying frame supported upon the planter-frame and having arms extending above its supporting hinges, a rock-shaft supported in bearings on the planter-frame and having cranks, flexible connecting means between said cranks and the trailer-carrying frame, and tension-springs connecting the cranks with the upward-extending arms.

7. An attachment for corn-planters comprising a frame having side members provided with bearings supported upon the planter-frame, trailing harrow-sections connected with the frame and laterally adjustable upon the latter, a rock-shaft supported in bearings on the planter-frame and comprising a tubular member and crank members adjustably connected therewith one of said crank members having a radially-extending lever, flexible members connecting the cranks with the side members of the frame, and adjusting and securing means for the rock-shaft.

8. A planter attachment comprising a rock-shaft supported in bearings on the planter-frame and having cranks, snap-hooks journaled upon said cranks, a frame having side members provided with bearings at their front ends, trailing harrow-sections attached to the frame, flexible connections between the trailers and frame, and chains secured upon the side members of the frame and connected adjustably with the snap-hooks.

9. An attachment for corn-planters comprising a frame having side members provided with bearings at their front ends supported upon the planter-frame, trailers connected flexibly with the rear portion of said frame, a rock-shaft supported in bearings on the planter-frame and having cranks, flexible members connecting the cranks with the side members of the frame, an adjusting-lever operatively connected to said rock-shaft and means for securing said lever at various adjustments.

10. An attachment for corn-planters comprising a frame having side members provided with bearings at their front ends, supported upon the planter-frame, trailers attached to the frame, flexible connections between the trailers and frame, a rock-shaft supported in bearings on the planter-frame and having cranks, flexible members connecting said cranks with the side members of the frame, an adjusting-lever operatively connected with said rock-shaft, springs each having one of its ends relatively fixed and connecting with said lever at its other end, and means for securing the lever at various adjustments.

In testimony that I claim the foregoing as my own I have hereto affixed my signature in the presence of two witnesses.

EMANUEL D. FISHER.

Witnesses:
 E. F. ANEY,
 JOHN MEYER.